United States Patent
Burgett et al.

(10) Patent No.: US 11,675,376 B2
(45) Date of Patent: Jun. 13, 2023

(54) TEMPERATURE-CONTROLLED PRESSURE REGULATOR ASSEMBLIES

(71) Applicant: TESCOM CORPORATION, Elk River, MN (US)

(72) Inventors: Eric J. Burgett, Saint Michael, MN (US); Jacob T. R. Renollett, Andover, MN (US)

(73) Assignee: TESCOM CORPORATION, Elk River, MN (US)

( * ) Notice: Subject to any disclaimer, the term of this patent is extended or adjusted under 35 U.S.C. 154(b) by 471 days.

(21) Appl. No.: 16/749,701

(22) Filed: Jan. 22, 2020

(65) Prior Publication Data
US 2020/0241581 A1     Jul. 30, 2020

Related U.S. Application Data

(60) Provisional application No. 62/796,480, filed on Jan. 24, 2019.

(51) Int. Cl.
*G05D 16/02*     (2006.01)
*G05D 16/06*     (2006.01)
(Continued)

(52) U.S. Cl.
CPC ......... *G05D 16/02* (2013.01); *G05D 16/0655* (2013.01); *G05D 16/2006* (2013.01); *G05D 23/1919* (2013.01); *F16K 49/002* (2013.01)

(58) Field of Classification Search
CPC .. F16K 49/002; G05D 23/1919; G05D 16/02; G05D 16/0655; G05D 16/2006;
(Continued)

(56) References Cited

U.S. PATENT DOCUMENTS 3,804,595 A * 4/1974 Scott .................. C01B 5/00
                                          252/372
3,820,050 A * 6/1974 Tyler .................. H01H 37/766
                                          337/414
(Continued)

FOREIGN PATENT DOCUMENTS

CN        1647224 A     7/2005
CN      101278599 A    10/2008

OTHER PUBLICATIONS

International Search Report and Written Opinion for PCT/US2020/014497, dated May 8, 2020.
(Continued)

*Primary Examiner* — Jessica Cahill
(74) *Attorney, Agent, or Firm* — Marshall, Gerstein & Borun LLP (57) ABSTRACT

A temperature-controlled pressure regulator assembly includes a regulator having a regulator body, a valve seat, an inlet, an outlet, and defines a flow passage connecting the inlet and the outlet. A control element controls the device, a portion of the flow passage extends through a heat chamber, and a heater is positioned to heat the chamber thereby conveying heat to a fluid in the flow passage. A controller is electrically coupled to the heater and is coupled to a power source. A thermal cut-off fuse is coupled to a control circuit, with the thermal cut-off fuse arranged to electrically decouple the heater from the control circuit in response to a temperature exceeding a threshold, thereby deactivating the heater. The thermal cut-off fuse is disposed in a circular fuse holder and positioned adjacent the heater and adjacent a longitudinal center of the heat chamber.

16 Claims, 6 Drawing Sheets

(51) Int. Cl.
    *G05D 16/20*     (2006.01)
    *G05D 23/19*     (2006.01)
    *F16K 49/00*     (2006.01)

(58) Field of Classification Search
    CPC ............ G05D 23/275; G05D 23/27536; Y10T 137/6606; H01H 37/74; H01H 37/76
    See application file for complete search history.

(56) References Cited

U.S. PATENT DOCUMENTS

| | | | |
|---|---|---|---|
| 4,281,308 A | 7/1981 | McVey | |
| 5,428,338 A * | 6/1995 | Nixon | H01H 37/76 337/414 |
| 6,345,611 B1 * | 2/2002 | Hartman | F02M 31/10 123/3 |
| 7,021,329 B2 * | 4/2006 | Hyde | G05D 16/0663 137/341 |
| 8,307,843 B2 * | 11/2012 | Patterson | G05D 23/19 137/340 |
| 9,022,064 B2 * | 5/2015 | Deng | F23C 1/00 137/489.5 |
| 9,535,427 B2 | 1/2017 | Patterson et al. | |
| 2005/0179516 A1 | 8/2005 | Yoshikawa | |
| 2006/0081290 A1 * | 4/2006 | Sachs | F17C 7/00 137/340 |
| 2010/0180960 A1 * | 7/2010 | Patterson | G05D 16/0663 137/340 |
| 2014/0130890 A1 * | 5/2014 | Chase | F25D 1/02 137/15.05 |
| 2016/0349773 A1 * | 12/2016 | Borowicz | H05B 1/02 |

OTHER PUBLICATIONS

Office Action issued in Chinese Patent Application No. 202010076894.8, dated Aug. 3, 2022.

* cited by examiner

TEMPERATURE-CONTROLLED PRESSURE REGULATOR ASSEMBLIES

FIELD OF THE DISCLOSURE

The present patent relates generally to pressure regulators and, in particular, to temperature-controlled pressure regulator assemblies having fuses that electrically decouple a heater when a temperature of the heater satisfies a threshold.

BACKGROUND

Temperature-controlled pressure regulators can be used to increase the temperature of the process media after a pressure drop occurs. The process media may be heated within the regulators using steam or an electric heater.

Figure 1:
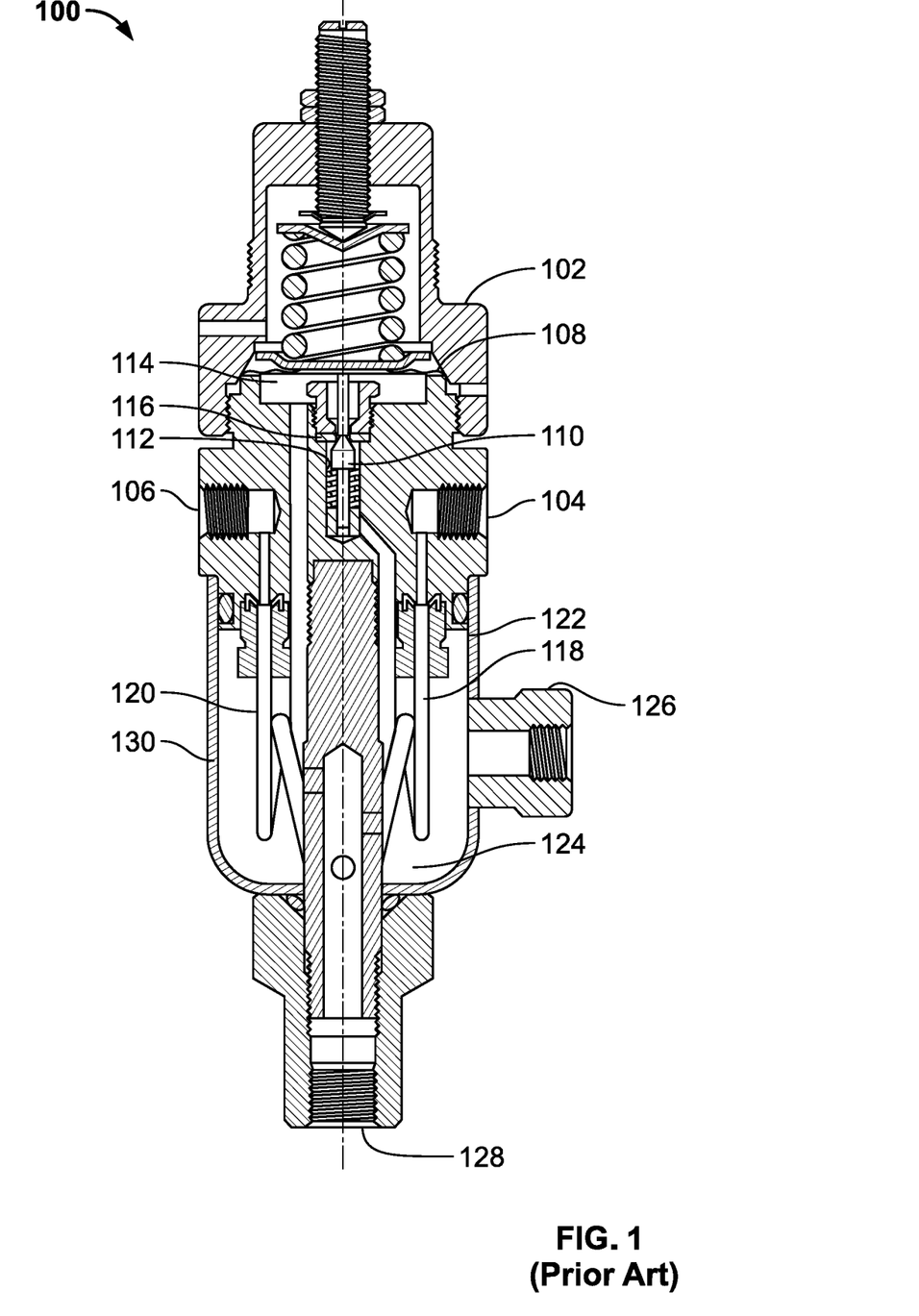
FIG. 1 is a cross-sectional view of a known temperature controlled pressure regulator.

Thermally controlled pressure regulators are known in the art. One example is shown in FIG. 1 of U.S. Pat. No. 9,535,427. As outlined in FIG. 1 of that patent (which Figure is attached hereto as FIG. 1), an example temperature-controlled pressure regulator described in accordance with the prior art is as follows. Known temperature-controlled pressure regulators 100 are typically used to control an outlet temperature (e.g., a predetermined temperature) of a process fluid flowing through the regulator 100. The regulator 100 includes a body 102 having an inlet 104 and an outlet 106. A diaphragm 108 and a flow control member 110 (e.g., a valve plug) are disposed within the body 102 to define an inlet chamber 112 and a pressure chamber 114. The diaphragm 108 moves the flow control member 110 relative to a valve seat 116 to control the pressure of the process fluid at the outlet 106. A first passageway 118 fluidly couples the inlet 104 to the inlet chamber 112 and a second passageway 120 fluidly couples the outlet 106 to the pressure chamber 114. A tubular body or heat chamber body 122 (e.g., a cylindrically-shaped body) is coupled (e.g., threadably coupled) to the body 102 of the regulator 100 to form a heat chamber 124. The heat chamber 124 receives at least a portion of the first and second passageways 118 and 120. The heat chamber body 122 also includes a heat transfer medium inlet port 126 and an outlet port 128. A heat transfer medium such as, for example, steam flows through the heat chamber 124 between the inlet port 126 and the outlet port 128.

In operation, the heat chamber 124 may receive steam up to a maximum pressure of about, for example, 250 psi and having a maximum temperature of about, for example, 350° F. As the steam flows through the heat chamber 124, energy (e.g., thermal energy or heat) from the steam is transferred to the process fluid via portions of the first and second passageways 118 and 120 that are disposed within the heat chamber 124. As a result, in some instances, the increase in heat causes the process fluid to vaporize or, in other instances, prevents condensation of the process fluid, for example, if the process fluid is already in a gaseous or vapor state as it enters the regulator 100 via the inlet 104.

However, with the known regulator 100 of FIG. 1, the media (e.g., steam) may be limited in the amount of heat it can transfer to the process fluid. In particular, for example, the pressure of the steam at the inlet 126 may be limited to a maximum pressure of about, for example, 250 psi. Restricting or limiting the pressure of the steam at the inlet 126 also limits the maximum temperature of the steam to about, for example, 350° F., which, in some instances, may be insufficient to vaporize or prevent condensation of a process fluid.

The pressure of the heat transfer media (e.g., steam) at the inlet 126 may be limited because the inlet 126 is typically welded to the heat chamber body 122. Thus, a weld joint (not shown) that couples the steam inlet 126 to a wall 130 of the heat chamber body 122 may not be able to withstand steam at pressures of, for example, greater than 250 psi. As noted above, limiting the pressure of the steam at the inlet 126 also limits the maximum temperature of the steam, which results in a lower heat transfer rate between the steam and the process fluid.

Additionally, welding the inlet 126 to the wall 130 of the heat chamber body 122 may also restrict or limit the thickness of the wall 130 to, for example, 1/16th (one sixteenth) of an inch. A wall (e.g., the wall 130) having such a limited thickness may not be able to withstand steam pressures greater than, for example, about 250 psi. Thus, the known temperature-controlled pressure regulator 100 may not be able to withstand heat transfer media pressures that are greater than, for example, about 250 psi, thereby limiting the temperature of the heat transfer media through the heat chamber 124 and, thus, providing lower process fluid outlet temperatures. Furthermore, welding the steam inlet port to the heat chamber body increases manufacturing costs, inventory costs, etc.

In other known examples, a steam tube passes through a flow path of a regulator body (e.g., the regulator body 102). Thus, the process fluid directly contacts the steam tube as it flows through the regulator. However, such a configuration typically provides a lower heat transfer rate because the heat tube is in contact with the process media for a short duration as the process fluid flows through the regulator, thereby providing lower process fluid outlet temperatures.

Prior art examples may be subject to various improvements.

SUMMARY

In accordance with a first exemplary aspect, a temperature-controlled pressure regulator assembly includes a regulator having a regulator body, a valve seat, an inlet, and an outlet, with the body defining a flow passage fluidly connecting the inlet and the outlet. A control element is disposed in the flow passage and is shiftable between a first position seated against the valve seat and a second position spaced away from the valve seat. A heat chamber is included, with a portion of the flow path extending through the heat chamber, and a heater is positioned to convey heat to the heat chamber thereby conveying heat to a fluid in the portion of the flow passage. A controller is electrically coupled to the heater by a control circuit, and the controller is also coupled to a power source and is arranged to control the heater. A thermal cut-off fuse is operatively coupled to the circuit, and the thermal cut-off fuse is arranged to electrically decouple the heater from the control circuit in response to a temperature exceeding a threshold, thereby deactivating the heater. The thermal cut-off fuse is disposed in a fuse holder.

In accordance with a second exemplary aspect, a temperature-controlled pressure regulator assembly includes a regulator having a regulator body, a valve seat, an inlet, and an outlet, with the body defining a flow passage fluidly connecting the inlet and the outlet, and with a control element disposed in the flow passage and shiftable between a first position seated against the valve seat and a second position spaced away from the valve seat. A portion of the flow passage extends through a heat chamber, and a heater is positioned to convey heat to the heat chamber thereby conveying heat to a fluid in the portion of the flow passage.

A controller is electrically coupled to the heater by a control circuit, with the controller also coupled to a power source and arranged to control the heater. A thermal cut-off fuse is operatively coupled to the circuit, with the thermal cut-off fuse arranged to electrically decouple the heater from the control circuit in response to a temperature exceeding a threshold, thereby deactivating the heater. The thermal cut-off fuse is disposed in a circular fuse holder and is positioned adjacent the heater and adjacent a longitudinal center of the heat chamber.

In accordance with a third aspect, a heater assembly for a temperature-controlled pressure regulator includes a heater sized for insertion into a heat chamber of the pressure regulator and is arranged to convey heat into the heat chamber. The heater includes a control circuit arranged for connection to a controller, with the heater being carried by a heater fitting, the heater fitting including a bore and arranged for securement to the heat chamber. A thermal cut-off fuse is operatively disposed in the circuit, and the thermal cut-off fuse is arranged to electrically decouple the heater from the control circuit in response to a temperature exceeding a threshold, thereby deactivating the heater. A fuse holder is coupled to the heater fitting, and the fuse holder includes a recess sized to receive the thermal cut-off fuse, with the fuse holder being sized for insertion in the bore of the heater fitting. Thus, the thermal cut-off fuse is positioned adjacent the heater and adjacent a longitudinal center of the heat chamber.

In further accordance with the foregoing first, second, and/or third aspects, a temperature-controlled pressure regulator and a heater assembly for such a regulator may further include any one or more of the following preferred forms.

In accordance with one preferred form, the thermal cut-off fuse includes electrical connectors for attachment to the controller, and a thermal component, and the fuse holder includes a bore and a recess. The bore is sized to permit passage of the electrical connectors from the thermal cut-off fuse to the controller, and the recess is centered relative to the bore and is sized to receive the thermal component.

In accordance with another preferred form, the recess forms a slot that extends transversely relative to the fuse holder and across the bore.

In accordance with another preferred form, the fuse holder is circular.

In accordance with another preferred form, the heat chamber is formed at least in part by a heater bonnet coupled to the valve body, and wherein the heater, the thermal cut-off fuse, and the fuse holder are coupled to a heater fitting, and the heater fitting is coupled to the heater bonnet.

In accordance with another preferred form, the heater fitting includes a counterbore sized to receive the fuse holder, and the thermal cut-off fuse is adjacent to the heater.

In accordance with another preferred form, the heater fitting is rotatably coupled to the heater bonnet.

In accordance with another preferred form, an internal surface of the heater bonnet comprises an internal step and an internal groove, and the heater fitting includes a flange, and including an internal lock ring sized to fit in the internal groove and engage the flange to secure the heater fitting within the heater bonnet.

In accordance with another preferred form, an external surface of the heater fitting includes a groove sized to receive a seal, the external surface of the heater fitting is sized to engage the internal surface of the heater bonnet, and the groove of the heater fitting includes a step positioned to engage and retain a portion of the seal.

In accordance with another preferred form, a gap is defined between the internal surface of the heater bonnet and the external surface of the heater fitting, with the gap sized to prevent flame propagation and/or pressure relief upon failure of the seal.

In accordance with another preferred form, the thermal cut-off fuse includes electrical connectors for attachment to the controller, and including a thermal component, and wherein the fuse holder includes a bore and a recess. The bore is sized to permit passage of the electrical connectors from the thermal cut-off fuse to the controller, and the recess is centered relative to the bore.

In accordance with another preferred form, the recess is a slot that extends transversely relative to the fuse holder and across the bore. The slot may have a first portion and a second portion disposed on opposite sides of the bore.

In accordance with another preferred form, the heat chamber is formed at least in part by a heater bonnet coupled to the valve body, and wherein the heater, the thermal cut-off fuse, and the fuse holder are coupled to a heater fitting. The heater fitting is coupled to the heater bonnet, and the fuse holder is circular and is sized to be received in a circular counterbore of the heater fitting.

In accordance with another preferred form, the heater fitting is rotatably coupled to the heater bonnet.

In accordance with another preferred form, an internal surface of the heater bonnet comprises an internal step and an internal groove, and wherein the heater fitting includes a flange, and including an internal lock ring sized to fit in the internal groove and engage the flange to secure the heater fitting within the heater bonnet.

In accordance with another preferred form, wherein an external surface of the heater fitting includes a groove sized to receive a seal, the external surface of the heater fitting sized to engage the internal surface of the heater bonnet, and wherein the groove of the heater fitting includes a step positioned to engage and retain a portion of the seal.

In accordance with another preferred form, wherein a gap is defined between the internal surface of the heater bonnet and the external surface of the heater fitting, the gap sized to prevent flame propagation and/or pressure relief upon failure of the seal.

DETAILED DESCRIPTION

Although the following text discloses a detailed description of one or more examples of the disclosed invention, it should be understood that the legal scope of the intellectual property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 2:
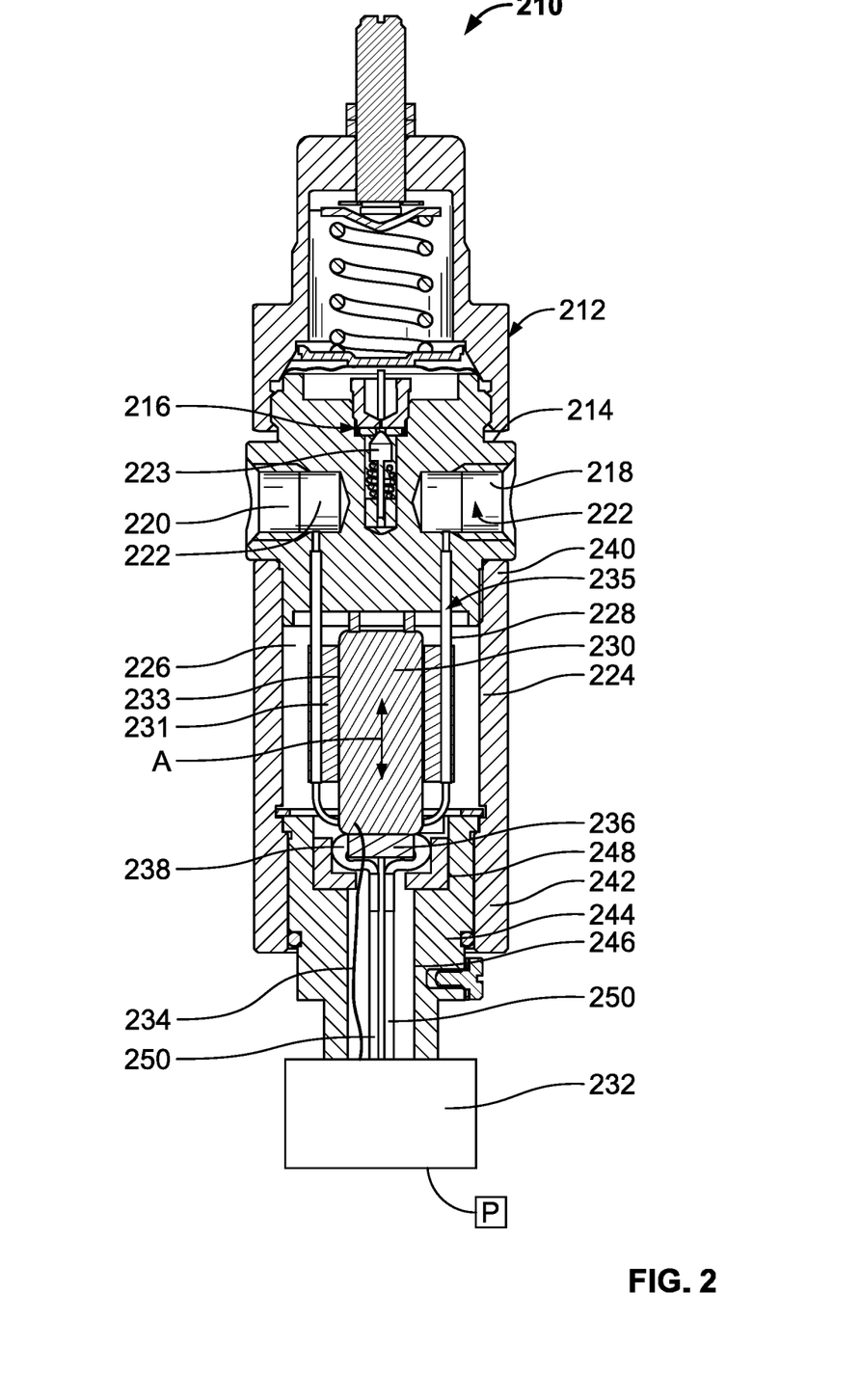
FIG. 2 illustrates a temperature-controlled pressure regulator assembled in accordance with the teachings of the present invention.

Referring now to FIG. 2 of the drawings, a temperature-controlled pressure regulator assembly (hereinafter "the regulator assembly") assembled in accordance with the teachings of a disclosed example of the present invention is shown and is referred to by the reference numeral 210. The regulator assembly 210 includes a regulator 212 having a regulator body 214, a valve seat 216, an inlet 218, and an outlet 220. The body 214 defines a flow passage 222 that fluidly connects the inlet 218 and the outlet 220, and that passes through the valve seat 216. The full extent of the flow passage 222 is not shown in FIG. 2, but those of skill in the relevant art will understand that the arrangement of the flow passage may take any suitable form, such as the arrangement shown in FIG. 1. A control element 223 is disposed in the flow passage 222 and, as understood by those in the relevant art, the control element 223 is shiftable between a first position seated against the valve seat 216, and a second position spaced away from the valve seat 216. The regulator assembly 210 includes a heat chamber 226 which, in the example shown, is attached to the body 214. At least a portion 228 of the flow passage 222 is disposed within the heat chamber 226. A heater 230 is positioned to convey heat to the heat chamber 226, thereby conveying heat to a fluid in the portion 228 of the flow passage 222. In the example shown, the heater 230 extends to a location within the heat chamber 226, although the heater 230 may also be disposed adjacent to the heat chamber 226. A controller 232 is electrically coupled to the heater 230 by a control circuit 234 (shown only schematically in FIG. 2). The controller 232 is coupled to a power source P (both the controller 232 and the power source P may be conventional and of the type commonly employed in the art), with the controller 232 being arranged to control the heater 230. The regulator assembly 210 includes a thermal cut-off fuse 236 which is operatively coupled to the circuit 234 and hence is operatively and/or electrically coupled to the controller 232. The thermal cut-off fuse 236 is disposed in a fuse holder 238.

Figure 7:
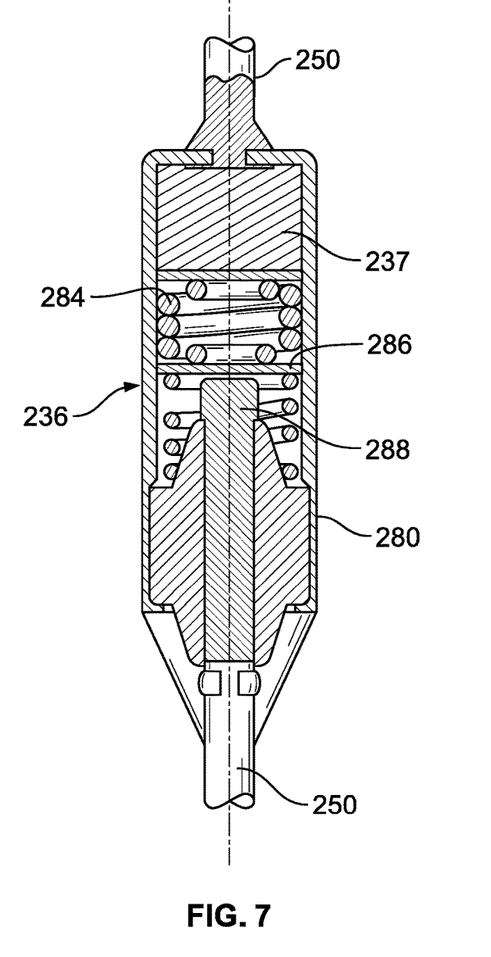
FIG. 7 is an enlarged cross-sectional view of the thermal cut-off fuse and illustrating the thermal component in its original condition to permit a closed circuit.
Figure 8:
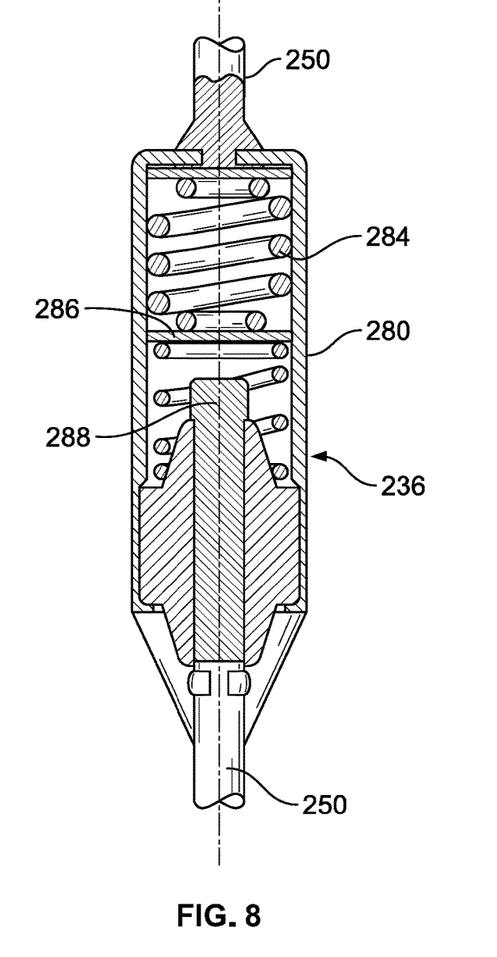
FIG. 8 is an enlarged cross-sectional view similar to FIG. 7 but showing the thermal component destroyed and thus opening the circuit.

In the example shown, the thermal cut-off fuse 236 includes a thermal component 237 (not shown in FIG. 2, but shown in FIGS. 7 and 8). The thermal fuse, in response to the fuse exceeding a temperature threshold, is arranged melt the thermal component 237, which causes the electrical link shown in FIGS. 7 and 8 to switch from a circuit closed state (FIG. 7) to a circuit open state (FIG. 8), thereby electrically decoupling the heater 230 from the control circuit 234, thereby deactivating the heater 230. As shown, the regulator assembly 210 includes a longitudinal axis A.

Referring still to FIG. 2, the regulator assembly 210 includes a heater block 231, and the heater 230 is disposed within a cylindrical space 233 in the heater block 231. The regulator assembly may include a manifold assembly 235 of the type commonly employed in the art, so that the portion 228 of the flow passage 222 extends through the heater block 231. Consequently, the heater 230 and the portion 228 of the flow passage 222 are positioned relative to one another such that heat from the heater 230 can be suitably conveyed from the heater 230 to fluid flowing through the regulator 212.

In the illustrated example, the regulator assembly 210 includes a heater bonnet 224 which helps to define or otherwise surround the heat chamber 226, with the heater bonnet 224 including a first end 240 and a second end 242. In the example shown, the thermal cut-off fuse 236 is disposed inside the heater bonnet 224. The first end 240 of the heater bonnet 224 is suitably coupled to the body 212, such as by a threaded connection or any other suitable connection, and a heater fitting 244 is connected adjacent the second end 242 of the heater bonnet 224. In the example shown, the heater 230, the thermal cut-off fuse 236, and the fuse holder 238 are all coupled to the heater fitting 244 and, in the example shown, are in direct contact. The arrangement of components may take any suitable form, and the heater 230, the fuse 236, and the fuse holder 238 assembled together may also include intervening parts in any suitable arrangement.

Figure 3:
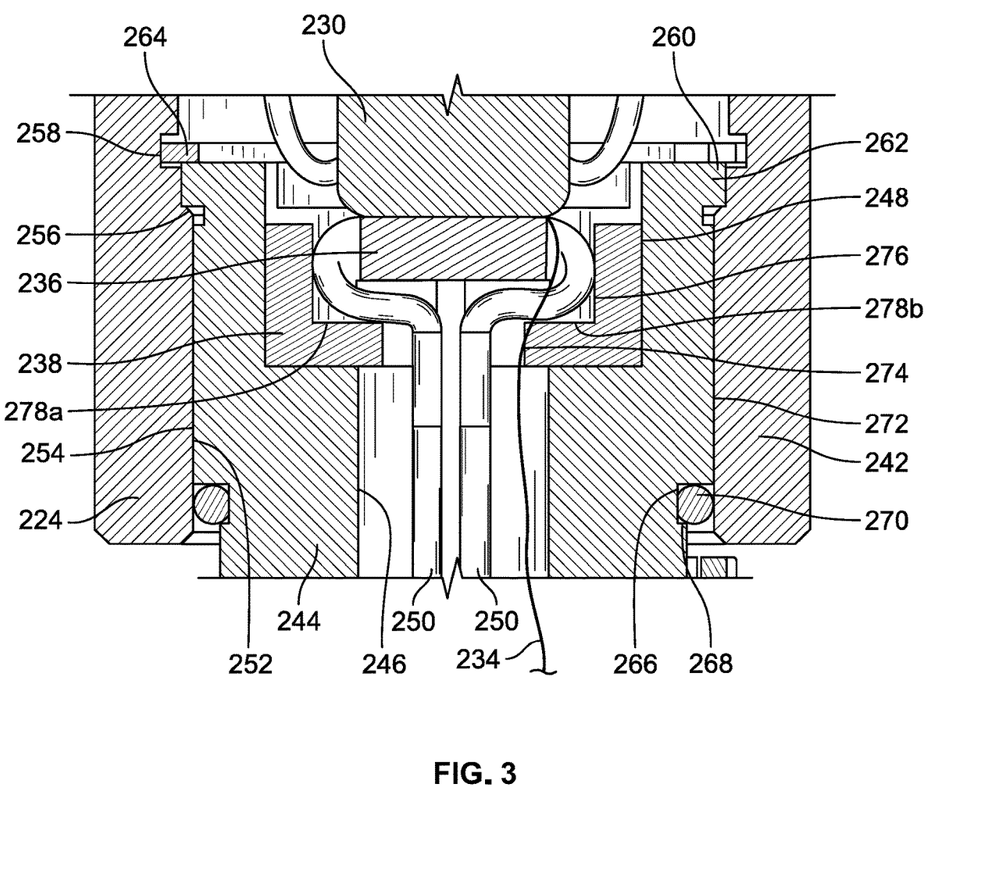
FIG. 3 is an enlarged fragmentary cross-sectional view of the temperature controlled pressure regulator of FIG. 2 and showing one exemplary location of the thermal cut-off fuse.

As shown in FIGS. 2 and 3, the heater fitting 244 includes a central bore 246 and a counterbore 248. The central bore 246 is sized to permit passage of the control circuit 234 between the controller 232 and the heater 230. The bore 246 is also sized to permit passage of electrical connectors 250 between the controller 232 and the thermal cut-off fuse 236. The counterbore 248 is sized to receive the fuse holder 238 as explained in greater detail below.

Referring now to FIG. 3, the second end 242 of the heater bonnet 224 and the heater fitting 244 are shown in enlarged form. The heater bonnet 224 includes an internal surface 252 surrounding an external surface 254 of the heater fitting 244. The internal surface 252 of the heater bonnet 224 includes and shoulder or step 256 and an internal groove 258. An upper end 260 of the heater fitting 244 includes an annular flange 262. A lock ring 264 is disposed in the groove 258 to secure the heater fitting within the heater bonnet 224, with the lock ring 264 limiting upward movement of the heater fitting 244. Downward movement of the heater fitting 244 is limited by the flange 262 engaging the step 256. Preferably, the heater fitting 244 is rotatable within the heater bonnet 224. The heater fitting 244 includes an external groove 266 having a step 268, and a seal 270 such as an O-ring or other suitable seal, is received within the groove 266. A gap 272 is defined between the heater bonnet 224 and the heater fitting 242.

In exemplary form, when the seal 270 is exposed to excessive pressure and blows out of the groove 266, the gap 272 may, in accordance with one exemplary form, enable pressure to exit the regulator assembly 210, and may prevent flame propagation.

Figure 4:
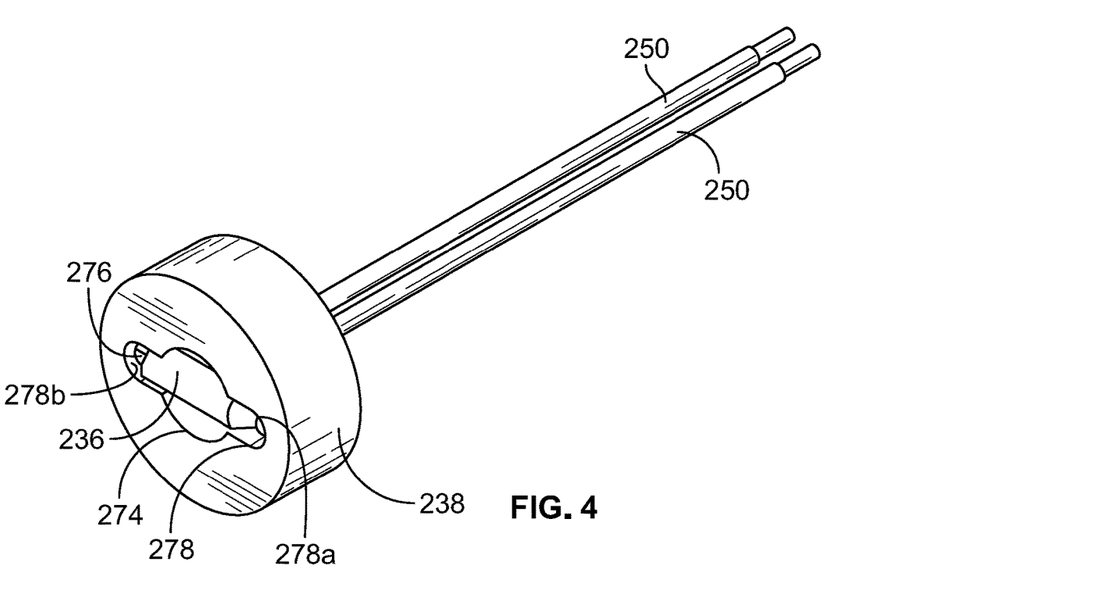
FIG. 4 a perspective view of a thermal cut-off fuse disposed is a fuse holder.
Figure 5:
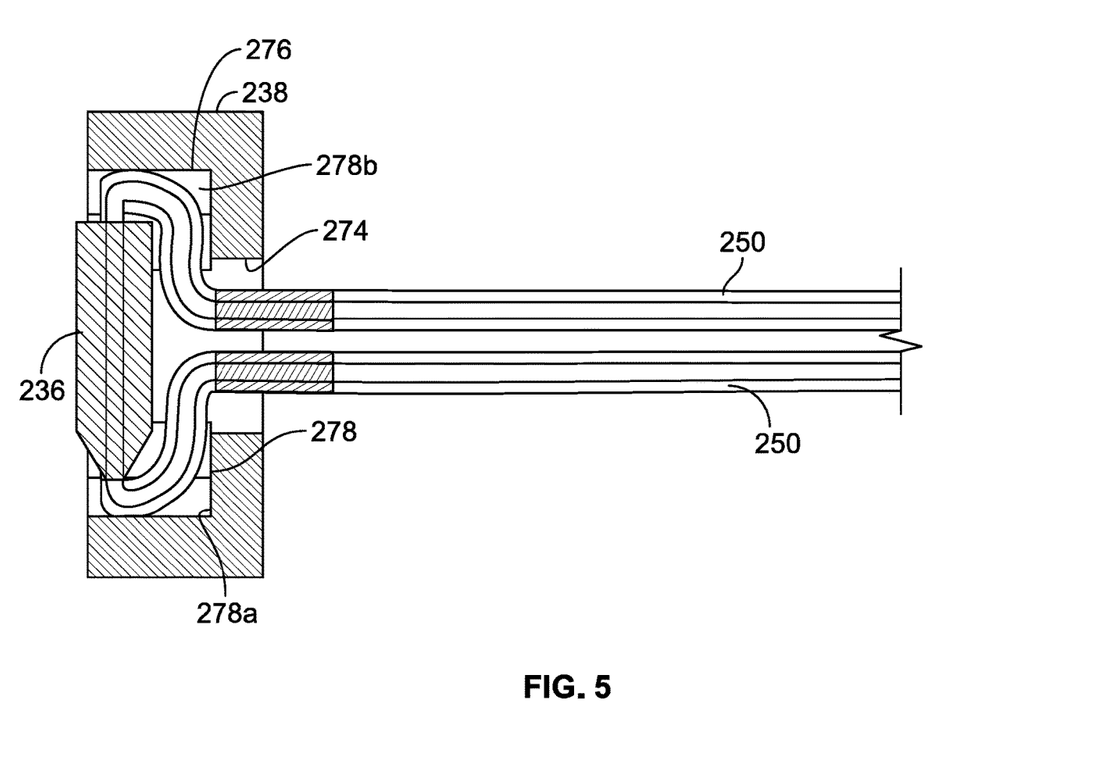
FIG. 5 is an enlarged cross-sectional view of the fuse and fuse holder.
Figure 6:
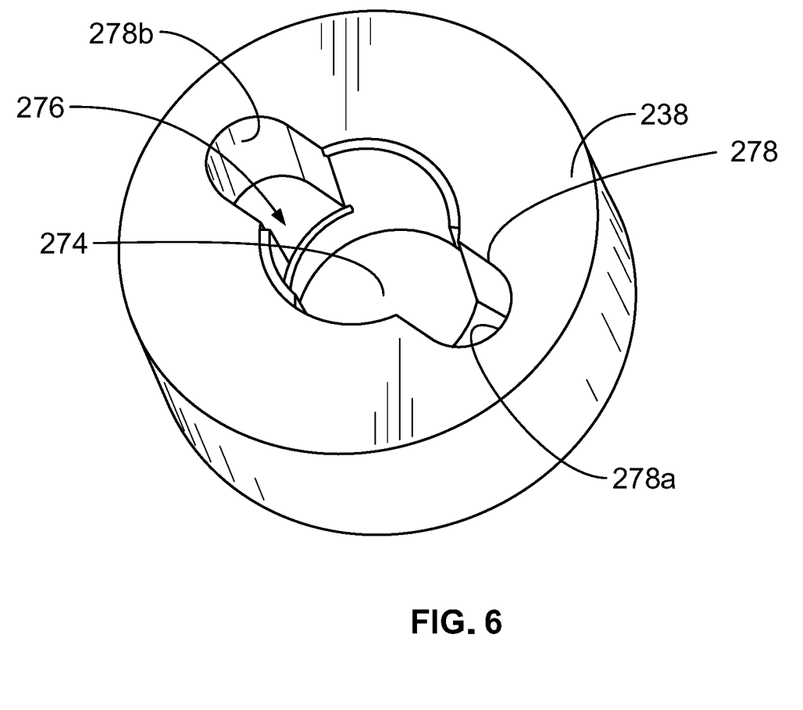
FIG. 6 is an enlarged view in perspective showing the fuse holder of FIG. 4 and illustrating a through bore and a transverse slot counter-sunk into the fuse holder.

Referring now to FIGS. 3-6, the fuse holder 238 includes a bore 274 and a recess 276. The bore 274 is sized to permit passage of the electrical connectors 250 and the circuit 234. In the illustrated example, the recess 276 is a transverse slot 278 having a first part 278a and a second part 278b disposed on opposite sides of the bore 274. Accordingly, as shown in FIGS. 3, 4 and 5, the thermal cut-off fuse 236 may be disposed in the transverse slot 278, supported by the parts 278a and 278b. Further, the thermal cut-off fuse is aligned with, roughly centered relative to, or at least intersects, the longitudinal axis A of the device. The recess 276 may take any suitable form, and further may be sized and/or shaped to receive thermal cut-off fuses of a variety of shapes and sizes.

As shown, the fuse holder 238 is circular and the counterbore 248 of the heater fitting 244 is circular. Those of skill in the art will understand that the fuse holder 238 and the corresponding counterbore 248 for receiving the fuse holder 238 may take any suitable form.

In the example shown, the recess 276 is sized to permit the electrical connectors 250 extending from the fuse 238 to bend approximately 90° relative to the fuse 238 and approximately 180° relative to one another. Thus, the fuse 238 and the connectors form a "hammer head" shape.

In the examples outlined herein, the heater fitting 244 and the fuse holder 238 are shown as separate components. Alternatively, the heater fitting 244 and the fuse holder 238 may be formed as an integral component or assembly.

Referring now to FIGS. 7 and 8, one exemplary form the thermal cut-off fuse 236 is shown. The fuse 236 includes a housing 280 holding the thermal component 237, a spring 284, and pair of electrical contacts 286 and 288, each connected to a corresponding one of the electrical connectors 250. In the circuit closed state of FIG. 7, the thermal component 282 abuts the spring 284, which in turn keeps the contacts 286 and 288 in contact with one another thus permitting the circuit closed condition across the fuse 236. When the temperature exceeds a threshold chosen by the user, the thermal component melts or is otherwise degraded, such that the spring forces the contacts 286 and 288 apart, thus breaking the electrical connection across the contacts resulting in the open circuit of FIG. 8.

From the foregoing disclosure, those of skill in the relevant art will appreciate that a device assembled in accordance with the teachings herein may prevent the temperature of temperature-controlled regulators from exceeding a threshold temperature. To prevent the temperature of the regulators having heaters from exceeding a threshold, the examples regulators disclosed herein include a thermal cut-off fuse(s) that is positioned in close proximity to the heater inside the heater bonnet. The heater bonnet may be manufactured out of pipe (instead of out of solid bar stock), thereby providing a cost saving.

In accordance with the disclosed example, a thermal cut-off fuse can be arranged to electrically decouple the heater and the electrical supply when the temperature of the regulator device exceeds a threshold. In accordance with an aspect, the cut-off fuse may be independent of operator control and thus is not turned on or off by operator inputs, as the fuse is housed within the regulator (e.g., within the heater bonnet) and is not controlled by an operator input. Thus, the operation of the thermal cut-off fuse may be independent of other control methods used in association with the pressure regulators.

In accordance with another aspect, placement of the fuse in line with, adjacent to, it intersecting the axis of the regulator device, may foster consistent placement at the same or very similar location in the regulator device, so as to provide repeatable, dependable and accurate readings. The central location of the fuse adjacent the heater reduces the likelihood that areas of the regulator have a temperature higher than the temperature experienced by the fuse.

In another aspect, to allow for pressure to escape the regulators and without flowing into the associated controller enclosure, a flow path may be defined between the heater fitting and the heater bonnet. An O-ring may be placed at the end of the flow path. When a pressure within the flow path exceeds a threshold, the pressure-build up moves the O-ring out of its seated location to enable the pressure to safely vent. The flow path and/or the O-ring may meet Hazardous Location (HAZlOC) requirements while acting like a relief valve (without including a separate relatively bulky relief valve). Additionally, the O-ring, acting as a seal, may prevent atmospheric liquids or particles from entering the regulator, satisfying a National Electrical Manufacturer Association (NEMA) rating or an Ingress Protection (IP) rating.

The electrical enclosure may be separable from the heater and the regulator, enabling the components to be separately shipped. Additionally, by enabling the electrical enclosure and the heater/regulator to be decoupled, the electrical enclosure can be spaced from the regulator and the heater while meeting HAZLOC requirements.

To allow for positioning of the ports of the regulator relative to the electrical enclosure, the regulator may be rotatably coupled to the heater fitting, via the heater bonnet. Specially, in some examples, a swivel connection meeting HAZLOC requirements is provided between the heater fitting and the heater bonnet.

While certain representative embodiments and details have been shown for purposes of illustrating the invention, it will be apparent to those skilled in the art that various changes in the methods and apparatus disclosed herein may be made without departing from the scope of the invention.

What is claimed is:

1. A temperature-controlled pressure regulator assembly, comprising:
   a regulator having a regulator body, a valve seat, an inlet, and an outlet;
   the body defining a flow passage fluidly connecting the inlet and the outlet;
   a control element disposed in the flow passage and shiftable between a first position seated against the valve seat and a second position spaced away from the valve seat;
   a heat chamber, a portion of the flow passage extending through the heat chamber;
   a heater positioned to convey heat to the heat chamber thereby conveying heat to a fluid in the portion of the flow passage;
   a controller electrically coupled to the heater by a control circuit, the controller coupled to a power source and arranged to control the heater;
   a thermal cut-off fuse operatively coupled to the circuit, the thermal cut-off fuse including electrical connectors for attachment to the controller, the thermal cut-off fuse arranged to electrically decouple the heater from the control circuit in response to a temperature exceeding a threshold, thereby deactivating the heater;
   a thermal component; and
   wherein the thermal cut-off fuse is disposed in a fuse holder, wherein the fuse holder includes a bore and a recess, the bore sized to permit passage of the electrical connectors from the thermal cut-off fuse to the controller, the recess being centered relative to the bore and sized to receive the thermal component; and
   wherein the recess forms a slot that extends transversely relative to the fuse holder and across the bore, and wherein the fuse holder is circular.

2. The temperature-controlled pressure regulator assembly of claim 1, wherein the heat chamber is formed at least in part by a heater bonnet coupled to the valve body, and wherein the heater, the thermal cut-off fuse, and the fuse holder are coupled to a heater fitting, and wherein the heater fitting is coupled to the heater bonnet.

3. The temperature-controlled pressure regulator assembly of claim 2, wherein the heater fitting includes a counterbore sized to receive the fuse holder, and wherein the thermal cut-off fuse is adjacent to the heater.

4. The temperature-controlled pressure regulator assembly of claim 2, wherein the heater fitting is rotatably coupled to the heater bonnet.

5. A temperature-controlled pressure regulator assembly, comprising:
   a regulator having a regulator body, a valve seat, an inlet, and an outlet;
   the body defining a flow passage fluidly connecting the inlet and the outlet;
   a control element disposed in the flow passage and shiftable between a first position seated against the valve seat and a second position spaced away from the valve seat;
   a heat chamber, a portion of the flow passage extending through the heat chamber;
   a heater positioned to convey heat to the heat chamber thereby conveying heat to a fluid in the portion of the flow passage;
   a controller electrically coupled to the heater by a control circuit, the controller coupled to a power source and arranged to control the heater;
   a thermal cut-off fuse operatively coupled to the circuit, the thermal cut-off fuse arranged to electrically decouple the heater from the control circuit in response to a temperature exceeding a threshold, thereby deactivating the heater;
   wherein the thermal cut-off fuse is disposed in a fuse holder; and
   wherein an internal surface of the heater bonnet comprises an internal step and an internal groove, and wherein the heater fitting includes a flange, and including an internal lock ring sized to fit in the internal groove and engage the flange to secure the heater fitting within the heater bonnet.

6. The temperature-controlled pressure regulator assembly of claim 5, wherein an external surface of the heater fitting includes a groove sized to receive a seal, the external surface of the heater fitting sized to engage the internal surface of the heater bonnet, the groove of the heater fitting including a step positioned to engage and retain a portion of the seal.

7. The temperature-controlled pressure regulator assembly of claim 6, wherein a gap is defined between the internal surface of the heater bonnet and the external surface of the heater fitting, the gap sized to prevent flame propagation and/or pressure relief upon failure of the seal.

8. A temperature-controlled pressure regulator assembly, comprising:
   a regulator having a regulator body, a valve seat, an inlet, and an outlet;
   the body defining a flow passage fluidly connecting the inlet and the outlet, and a control element disposed in the flow passage and shiftable between a first position seated against the valve seat and a second position spaced away from the valve seat;
   a portion of the flow passage extending through a heat chamber, and a heater positioned to convey heat to the heat chamber thereby conveying heat to a fluid in the portion of the flow passage;
   a controller electrically coupled to the heater by a control circuit, the controller coupled to a power source and arranged to control the heater;
   a thermal cut-off fuse operatively coupled to the circuit, the thermal cut-off fuse arranged to electrically decouple the heater from the control circuit in response to a temperature exceeding a threshold, thereby deactivating the heater; and
   wherein the thermal cut-off fuse is disposed in a circular fuse holder and positioned adjacent the heater and adjacent a longitudinal center of the heat chamber.

9. The temperature-controlled pressure regulator assembly of claim 8, wherein the thermal cut-off fuse includes electrical connectors for attachment to the controller, and a thermal component, and wherein the fuse holder includes a bore and a recess, the bore sized to permit passage of the electrical connectors from the thermal cut-off fuse to the controller, and wherein the recess is centered relative to the bore.

10. The temperature-controlled pressure regulator assembly of claim 9, wherein the recess is a slot that extends transversely relative to the fuse holder and across the bore, the slot having a first portion and a second portion disposed on opposite sides of the bore.

11. The temperature-controlled pressure regulator assembly of claim 8, wherein the heat chamber is formed at least in part by a heater bonnet coupled to the valve body, and wherein the heater, the thermal cut-off fuse, and the fuse holder are coupled to a heater fitting, the heater fitting being coupled to the heater bonnet, and wherein the fuse holder is circular and is sized to be received in a circular counterbore of the heater fitting.

12. The temperature-controlled pressure regulator assembly of claim 11, wherein the heater fitting is rotatably coupled to the heater bonnet.

13. The temperature-controlled pressure regulator assembly of claim 8, wherein an internal surface of the heater bonnet comprises an internal step and an internal groove, and wherein the heater fitting includes a flange, and including an internal lock ring sized to fit in the internal groove and engage the flange to secure the heater fitting within the heater bonnet.

14. The temperature-controlled pressure regulator assembly of claim 13, wherein an external surface of the heater fitting includes a groove sized to receive a seal, the external surface of the heater fitting sized to engage the internal surface of the heater bonnet, the groove of the heater fitting including a step positioned to engage and retain a portion of the seal.

15. The temperature-controlled pressure regulator assembly of claim 14, wherein a gap is defined between the internal surface of the heater bonnet and the external surface of the heater fitting, the gap sized to prevent flame propagation and/or pressure relief upon failure of the seal.

16. A heater assembly for a temperature-controlled pressure regulator, comprising:
   a heater sized for insertion into a heat chamber of the pressure regulator and arranged to convey heat into the heat chamber;
   the heater including a control circuit, the control circuit arranged for connection to a controller;
   the heater carried by a heater fitting, the heater fitting including a bore and arranged for securement to the heat chamber;
   a thermal cut-off fuse operatively disposed in the circuit, the thermal cut-off fuse arranged to electrically decouple the heater from the control circuit in response to a temperature exceeding a threshold, thereby deactivating the heater; and
   a fuse holder coupled to the heater fitting, the fuse holder including a recess sized to receive the thermal cut-off fuse, the fuse holder sized for insertion in the bore of the heater fitting, whereby by the thermal cut-off fuse is positioned adjacent the heater and adjacent a longitudinal center of the heat chamber.

\* \* \* \* \*

UNITED STATES PATENT AND TRADEMARK OFFICE
CERTIFICATE OF CORRECTION

PATENT NO. : 11,675,376 B2
APPLICATION NO. : 16/749701
DATED : June 13, 2023
INVENTOR(S) : Eric J. Burgett et al.

It is certified that error appears in the above-identified patent and that said Letters Patent is hereby corrected as shown below:

In the Specification

At Column 4, Line 55, "a perspective" should be -- is a perspective --.

At Column 5, Line 56, "arranged" should be -- arranged to --.

At Column 7, Line 15, "form" should be -- form of --.

Signed and Sealed this
Second Day of July, 2024

*Katherine Kelly Vidal*

Katherine Kelly Vidal
*Director of the United States Patent and Trademark Office*